(12) United States Patent
Dorsett et al.

(10) Patent No.: US 10,731,789 B1
(45) Date of Patent: Aug. 4, 2020

(54) SUPPORT DEVICE FOR A PURSE OR OTHER PERSONAL ITEM

(71) Applicants: Leslie J. Dorsett, Miramar, FL (US); Bernard A. Dorsett, Miramar, FL (US)

(72) Inventors: Leslie J. Dorsett, Miramar, FL (US); Bernard A. Dorsett, Miramar, FL (US)

( * ) Notice: Subject to any disclaimer, the term of this patent is extended or adjusted under 35 U.S.C. 154(b) by 133 days.

(21) Appl. No.: 14/693,104

(22) Filed: Apr. 22, 2015

Related U.S. Application Data (60) Provisional application No. 61/986,305, filed on Apr. 30, 2014.

(51) Int. Cl.
| | |
|---|---|
| *F16M 11/38* | (2006.01) |
| *F16B 1/00* | (2006.01) |
| *F16M 11/04* | (2006.01) |
| *A47G 29/08* | (2006.01) |

(52) U.S. Cl.
CPC ............ *F16M 11/38* (2013.01); *A47G 29/08* (2013.01); *F16B 1/00* (2013.01); *F16M 11/04* (2013.01); *F16B 2001/0035* (2013.01)

(58) Field of Classification Search
CPC .......... F16M 11/38; A47G 29/08; A47C 4/44; A47C 5/10; A47C 4/34; F16B 1/00
USPC ....... 248/172, 173, 914, 166, 434, 435, 439; 297/16.1, 16.2, 27, 35, 39, 40, 59, 42
See application file for complete search history.

(56) References Cited

U.S. PATENT DOCUMENTS

| | | | | |
|---|---|---|---|---|
| 396,496 | A * | 1/1889 | Kempster | A47D 11/005 297/11 |
| 718,412 | A * | 1/1903 | Bach et al. | F24B 1/205 126/304 R |
| 857,914 | A * | 6/1907 | Weber | |
| 967,890 | A * | 8/1910 | Diemer | A47C 17/12 297/116 |
| 1,157,795 | A | 10/1915 | Mix | |
| 1,386,612 | A * | 8/1921 | Farah | A47C 17/163 297/54 |
| 2,565,719 | A | 8/1951 | Church | |
| 2,652,882 | A * | 9/1953 | Kotler | A47C 4/40 297/29 |
| 3,083,995 | A * | 4/1963 | Bradshaw | A47C 4/34 297/39 |
| 3,984,074 | A * | 10/1976 | Forman | A47F 5/13 248/166 |
| 4,131,261 | A * | 12/1978 | Shy | A47J 37/0786 108/132 |

(Continued)

FOREIGN PATENT DOCUMENTS

JP        2002199966 A  *  7/2002

*Primary Examiner* — Kimberly T Wood
(74) *Attorney, Agent, or Firm* — John Rizvi; John Rizvi, P.A.—The Patent Professor (57) ABSTRACT

A foldable support device for a purse or other personal item is described. The foldable support device is easily transportable when folded, and can be unfolded into a stable, secure and clean support for placing personal items. The support device includes a support structure, from which transverse wings and longitudinal wings can be unfolded in order to provide a supporting structure to the personal item. In addition, the support device includes outwardly unfoldable leg members configured to support the wings at a certain distance from the ground. The support device can include a magnetic latch to prevent legs from unfolding. The wings and/or legs can be adjustable in length and/or width.

17 Claims, 7 Drawing Sheets

(56) References Cited

U.S. PATENT DOCUMENTS

| | | | |
|---|---|---|---|
| 4,238,100 A * | 12/1980 | Shy | F16M 11/38 |
| | | | 108/132 |
| 4,508,384 A * | 4/1985 | Castelot | A47C 1/143 |
| | | | 297/108 |
| 4,544,203 A | 10/1985 | Younger et al. | |
| 4,621,608 A * | 11/1986 | Lee | A47J 37/0763 |
| | | | 126/25 A |
| 4,633,536 A * | 1/1987 | Tribble-DuBose | A47K 11/02 |
| | | | 4/144.2 |
| 4,887,836 A * | 12/1989 | Simjian | B62B 3/02 |
| | | | 280/47.371 |
| 4,948,077 A * | 8/1990 | Gonzalez | B62B 3/002 |
| | | | 248/129 |
| 5,044,690 A | 9/1991 | Torrey | |
| 5,179,932 A * | 1/1993 | DeCarlo | A47J 37/0763 |
| | | | 126/9 R |
| 5,244,255 A | 9/1993 | Hill | |
| 5,246,265 A * | 9/1993 | Nagan | A47C 3/38 |
| | | | 297/31 |
| 5,498,054 A * | 3/1996 | Tomlinson | A47C 4/02 |
| | | | 297/16.2 |
| 5,509,360 A | 4/1996 | Chiu | |
| 5,833,200 A | 11/1998 | Patterson | |
| 5,950,259 A * | 9/1999 | Boggs | A47C 1/143 |
| | | | 297/900 |
| 6,561,107 B1 * | 5/2003 | Wood | A47B 3/0812 |
| | | | 108/132 |
| 7,048,331 B2 | 5/2006 | Saakyan | |
| 7,055,847 B2 * | 6/2006 | Miller | B62B 3/022 |
| | | | 248/161 |
| 7,328,953 B2 * | 2/2008 | Werschmidt | A47K 3/125 |
| | | | 297/34 |
| 7,451,709 B2 * | 11/2008 | Swartfager | F25D 23/12 |
| | | | 108/14 |
| 8,136,873 B2 | 3/2012 | Fritsch et al. | |
| 2002/0095723 A1 * | 7/2002 | Nation | A47C 1/143 |
| | | | 5/110 |
| 2003/0011219 A1 * | 1/2003 | Chun-Yueh | A47C 1/143 |
| | | | 297/51 |
| 2006/0071513 A1 * | 4/2006 | Pedemonte | A47C 1/143 |
| | | | 297/16.1 |
| 2006/0108497 A1 | 5/2006 | Miranda | |
| 2011/0056233 A1 * | 3/2011 | Flaker | A63B 71/023 |
| | | | 62/457.7 |
| 2013/0214565 A1 * | 8/2013 | Nickell | A47C 1/143 |
| | | | 297/30 |
| 2014/0015287 A1 * | 1/2014 | Zhu | A47C 4/28 |
| | | | 297/35 |
| 2014/0077467 A1 * | 3/2014 | Galante | B62B 1/12 |
| | | | 280/35 |

\* cited by examiner

SUPPORT DEVICE FOR A PURSE OR OTHER PERSONAL ITEM

CROSS-REFERENCE TO RELATED APPLICATION

The application claims the benefit of U.S. Provisional Patent Application Ser. No. 61/986,305, filed Apr. 30, 2014, which is incorporated herein in its entirety.

FIELD OF THE INVENTION

The present invention relates generally to supports for a personal item. More particularly, the present invention is directed to a foldable support device for providing support for a purse or other personal item, thereby preventing contamination of the aforementioned by bio-matter, dirt, chemicals or other debris that is found on typical unclean surfaces. The device is foldable to a compact state, facilitating its transportation and storage.

BACKGROUND OF THE INVENTION

The modern era has opened doors for women previously closed to their sex; this has permitted them to advance in various disciplines previously reserved for their counterparts. A direct result of this has been the increasing purchasing power that women bring to bear in the marketplace. Along with these new opportunities and earning potential they need to maintain a fashionable and reliable wardrobe that can become expensive to maintain and replace as needed. Thus, women have had to invest a large amount of money in the acquisition of expensive items to maintain the look of a professional, mother, and or wife.

Amongst the many accessories and other items that they routinely purchase, it is the ubiquitous designer bag that seems to be the fashion statement nonpareil. As they take the bag or other items to functions or events they sometimes find that in the lady's room or powder room there is no place to rest their bag or other such item in a convenient sanitary location; this can be most unpleasant as not all locations maintain a pristine environment; thus, they are forced to lay the item on the floor, dirty countertop or similar place.

Thus routine use of the bag or other personal item at functions or events is very likely to necessitate the contamination thereof by hazardous or unpleasant bio-matter or other materials that they would prefer not touch their purse, accessories, or other items. This problem has led some to perform studies as to the amount of unwanted bio-matter taking up residence on a woman's handbag. These studies have indeed shown that they can have many more germs on them than the average toilet at the very same function. This is not an acceptable situation for most women.

One particular prior art solution teaches the use of a hoop to hang a purse from a piece of furniture such as a table. U.S. Patent Application No. US20060108497 filed by applicant Miranda is directed to a holding device engageable with a surface of a table or the like for securing fashion accessories such as handbags or purses, includes a base having an orifice, an anti-slip member attached to the base and configured for engaging the surface, and an arm assembly rotatable with respect to the base and having a first end configured for being received by the orifice. The problem with Miranda is that a convenient surface whereupon a user may hang the device is not always present; further, the device only permits the hanging of a device having a surface cooperating with the Miranda hoop, i.e., a purse having a shoulder strap or similar strip of material. If the personal item is not conducive to being hung thereupon, there is no way for the teaching of Miranda to provide a support therefore. Finally, the hoop of material overly stresses the material of the expensive purse thereby reducing the life thereof.

Accordingly, there needs to be some solution to overcome the aforementioned problems.

SUMMARY OF THE INVENTION

The present invention overcomes the deficiencies of the known art and the problems that remain unsolved by providing a foldable support device for a purse or other personal item, which, when folded, is easily transportable (e.g., inside the purse itself), and can be unfolded into a stable, secure and clean support for placing the purse or other personal items. The support device includes a pair of oppositely disposed main trusses connected by two transverse trusses. Additional connection there between is provided by four transverse trusses mounted two in the anterior and two in the posterior of the device upon the ends of four small vertical crossbars welded to the end of the main trusses. Eight bushing mounts are located at the ends of the crossbars thereby providing rotational translation thereupon for transverse mounted wings and legs. Longitudinally mounted wings are rotationally attached upon the oppositely disposed main truss member. Optional magnetic leg closure and variable leg, main truss, and transverse mounted wings are provided.

In accordance with one embodiment of the invention, the present invention consists of a foldable support device for supporting items, including a rectilinear support frame having a front, a back, a first end and an opposing second end. A foldable leg is rotatably affixed to a bottom of the support frame at each of the first end and the second end. Each foldable leg is selectively rotatable between a retracted position for stowage against a bottom of the support frame and an extended position for supporting the device above a surface. A foldable lateral wing is rotatably affixed to a top of the support frame at each of the first end and the second end, each lateral wing is selectively rotatable between a retracted position for stowage against a top of the support frame and an extended position for supporting an item thereupon.

In another aspect the foldable support device also includes a foldable anterior wing rotatably affixed to the front of the support frame and selectively rotatable between a retracted position for stowage towards a top of the support frame and an extended position to aid in supporting an item thereupon, and a foldable posterior wing rotatably affixed to the back of the support frame and selectively rotatable between a retracted position for stowage against a top of the support frame and an extended position to aid in supporting an item thereupon.

In another aspect, each foldable leg is formed as a U-shaped structure having two opposed free ends and further wherein each free end is rotatably attached to a respective one of the first end and the second end of the support frame.

In still another aspect, each the lateral wing is formed as a U-shaped structure having two opposed free ends and further wherein each free end is rotatably attached to a respective one of the first end and the second end of the support frame.

In yet another aspect, the foldable support device includes at least one bushing at each corner of the rectilinear support frame, one of the lateral wings rotatably attached to and rotatable about the bushings at the first end of the support frame and another of the lateral wings rotatably attached to and rotatable about the bushings at the second end of the support frame.

In a still further aspect, the foldable support device includes two bushings at each corner of the rectilinear support frame, the two bushings being vertically separated one from the other, and further wherein one of the lateral wings is rotatably attached to and rotatable about an upper pair of the bushings at the first end of the support frame and another of the lateral wings is rotatably attached to and rotatable about an upper pair of the bushings at the second end of the support frame.

In another aspect, one of the foldable legs is rotatably attached to and rotatable about a lower pair of the bushings at the first end of the support frame and another of the foldable legs is rotatably attached to and rotatable about a lower pair of the bushings at the second end of the support frame.

In another aspect, the foldable support device further includes a truss extending between the upper bushings at the first end, a truss extending between the upper bushings at the second end, a truss extending between the lower bushings at the first end and a truss extending between the lower bushings at the second end, each truss is affixed to the support frame and supports the bushings.

In a still further aspect, the foldable support device includes a magnetic latch selectively movable between a locked position and an unlocked position, the magnetic latch includes a linear protrusion affixed to a first of the legs and a magnet affixed to a free end of the linear protrusion, the magnet engageable with a second of the legs to secure the legs in a stowed configuration.

In yet another aspect, the foldable support device includes an outer layer closely encasing at least the support frame, the foldable legs, and the foldable lateral wings.

In another aspect, at least one of the support frame, the foldable lateral wings, and the foldable legs is broken into separable portions, the portions including a snap button closure or other locking mechanism on one portion and a plurality of regularly spaced perforations in a mating portion for selectively extending a size of at least one of the support frame, the foldable lateral wings, and the foldable legs.

Introducing another embodiment of the invention, a foldable support device for supporting items includes a rectilinear support frame having a front, a back, a first end and an opposing second end. A foldable leg is formed as a U-shaped structure having two opposed free ends, each free end is rotatably affixed to a bottom of the support frame at the first end of the support frame. A foldable leg is formed as a U-shaped wire having two opposed free ends, each free end is rotatably affixed to a bottom of the support frame at the second end. Each foldable leg is selectively rotatable between a retracted position for stowage against a bottom of the support frame and an extended position for supporting the device above a surface. A foldable lateral wing is formed as a U-shaped structure having two opposed free ends, each free end rotatably affixed to a top of the support frame at the first end, and a foldable lateral wing formed as a U-shaped wire having two opposed free ends each free end is rotatably affixed to a top of the support frame at the second end. Each lateral wing is selectively rotatable between a retracted position for stowage against a top of the support frame and an extended position for supporting an item thereupon.

Introducing yet another embodiment of the invention, a foldable support device for supporting items includes a rectilinear support frame having a front, a back, a first end and an opposing second end, wherein the support frame includes two bushings at each corner thereof, the two bushings being vertically separated one from the other, and further wherein one of the lateral wings is rotatably attached to and rotatable about an upper pair of the bushings at the first end of the support frame and another of the lateral wings is rotatably attached to and rotatable about an upper pair of the bushings at the second end of the support frame. A foldable leg is formed as a U-shaped wire having two opposed free ends rotatably attached to a lower pair of bushings at the first end of the support frame. Another foldable leg is formed as a U-shaped wire having two opposed free ends rotatably affixed to a lower pair of bushings at the second end of the support frame. Each foldable leg is selectively rotatable between a retracted position for stowage against a bottom of the support frame and an extended position for supporting the device above a surface. A foldable lateral wing is formed as a U-shaped wire having two opposed free ends rotatably attached to a top pair of bushings at the first end of the support frame. Another foldable lateral wing is formed as a U-shaped wire having two opposed free ends rotatably attached to a top pair of bushings at the second end of the support frame. Each the lateral wing is selectively rotatable between a retracted position for stowage against a top of the support frame and an extended position for supporting an item thereupon. A foldable anterior wing is rotatably affixed to the front of the support frame and selectively rotatable between a retracted position for stowage against a top of the support frame and an extended position to aid in supporting an item thereupon. A foldable posterior wing is rotatably affixed to the back of the support frame and selectively rotatable between a retracted position for stowage against a top of the support frame and an extended position to aid in supporting an item thereupon.

These and other aspects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

The support device as described herein is preferably manufactured from a metallic structure optionally covered with an outer layer. The outer layer is made from a protective material such as plastic, rubber, leather or similar material that provides added protection from damage due to rough handling thereof. Preferably, the support device is rapidly foldable into a generally flat rectangular folded position and can be selectively unpacked into a deployed position. In the deployed position, the support device provides a support surface that is raised above the floor surface. The flat rectangular folded position, in turn, greatly simplifies the storage and transportation of the support device. There are numerous modifications that are possible given the embodiments that are described herein which are for teaching purposes. For example, the support device can have a variable number of foldable legs; preferably, however, it has two foldable leg members as shown in the drawings and described below. Additionally, the support device has foldable longitudinal wings, preferably two or four foldable transverse wings. Thus, the number of components is variable and based upon the implementation requirements.

Figure 1:
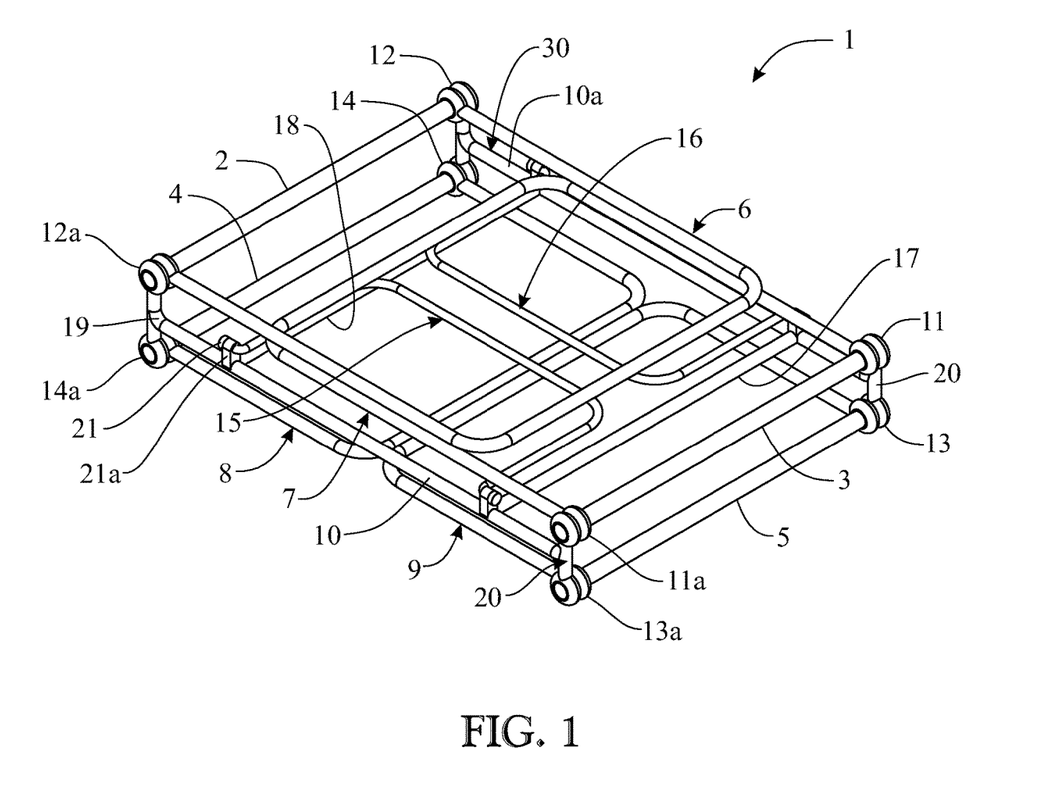
FIG. 1 presents an isometric view of an exemplary embodiment of a support device in accordance with the invention, shown in a folded position.

The illustration of FIG. 1 presents an isometric view of the support device in a folded position in accordance with a first embodiment of the invention. The support device 1 comprises a variety of components hereinafter described; in particular, it comprises four transverse outer members 2, 3, 4, 5; two pivotable transverse wings 6, 7; two pivotable leg members 8, 9; two main trusses 10, 10a; eight bushings 11, 11a, 12, 12a, 13, 13a, 14, 14a; two pivotable longitudinal wings 15, 16; and finally, two pivotable trusses 17, 18. Various other smaller components that assist in forming the frame of the overall device are to be hereinafter described.

First, a support frame 30 includes the two main trusses 10, 10a that are connected together by the ends of two transverse trusses 17, 18 welded thereto on the right and the left respectively; thus, transverse truss 17 has one end welded to main truss 10 and its other end welded to main truss 10a at a short distance from the ends of the main trusses 10, 10a; similarly, transverse truss 18 has one end welded to main truss 10 and its other end welded to main truss 10a at a short distance from the ends of the main trusses 10, 10a. This basic support frame 30 forms the backbone of the overall support device. The four ends of the two main trusses 10, 10a are curved upwards as a small portion 19 of material that is welded to and blends into a supplemental crossbar 20 for a total of four crossbars 20. This crossbar 20 is welded to two bushings at either end for a total of eight bushings 11, 11a, 12, 12a, 13, 13a, 14, 14a.

The four transverse outer members 2, 3, 4, 5 interconnect the various bushings 11, 11a, 12, 12a, 13, 13a, 14, 14a as hereinafter described and as indicated by the number pairings, e.g., 11, 11a; 12, 12a; etc. For example, metallic transverse member 2 extends from bushing 12a to bushing 12. In the present embodiment, the metallic transverse member 2 passes through the hole(s) in the flanged circular portion(s) of the bushings 12, 12a through the intermediate cylinder(s) of the bushing(s) 12, 12a and out the hole(s) of the large external flat circular wheel shape portion(s) of the bushings 12, 12a whereupon it is welded to the periphery (ies) in the vicinity of the central hole(s) or aperture(s) thereof. This same arrangement is multiplied with respect to the other pairings of transverse trusses to bushing connections: 3, 11, 11a; 4, 14, 14a; 5, 13, 13a.

Thus, the pivotable members (two transverse wings 6, 7; two leg members 8, 9) rotate atop their hollowed out cylindrical portion that sits atop the intermediate cylinder of the bushings 11, 11a, 12, 12a, 13, 13a, 14, 14a. It should be easily understood from the drawings that the pivotable members (two transverse wings 6, 7; two leg members 8, 9) are U-shaped metallic members that each rotate at the ends thereof upon two cooperating bushings 11, 11a; 12, 12a; 13, 13a; 14, 14a supported upon a respective transverse member 3, 2, 5, 4 respectively. Thus, the transverse wings 6, 7 and the leg members 8, 9 are disposed to rotate to the upper left and lower right in the figure.

In contrast to the pivotable members 6, 7, 8, 9 described previously, the two longitudinal wings 15, 16 are pivotably attached to the support frame 30 and are disposed to rotate to the lower left and upper right in the figure along the longitudinal main trusses 10, 10a. The longitudinal wings 15, 16 are U-shaped and end in two small outward protrusions 21 that are pivotably attached to two corresponding clamps 21a affixed to the respective main truss 10, 10a. The clamps 21a of the present embodiment include a semicircular top section and a rectangular bottom section. The bottom section of the clamp 21a is welded to the main truss 10, 10a. In turn, the semicircular top sections rotatably receive the outward protrusions 21 of the longitudinal wings 15, 16. One skilled in the art, however, will understand that alternative mechanisms can be used in order to provide an articulated connection between the longitudinal wings 15, 16 and the support frame 30.

Figure 2:
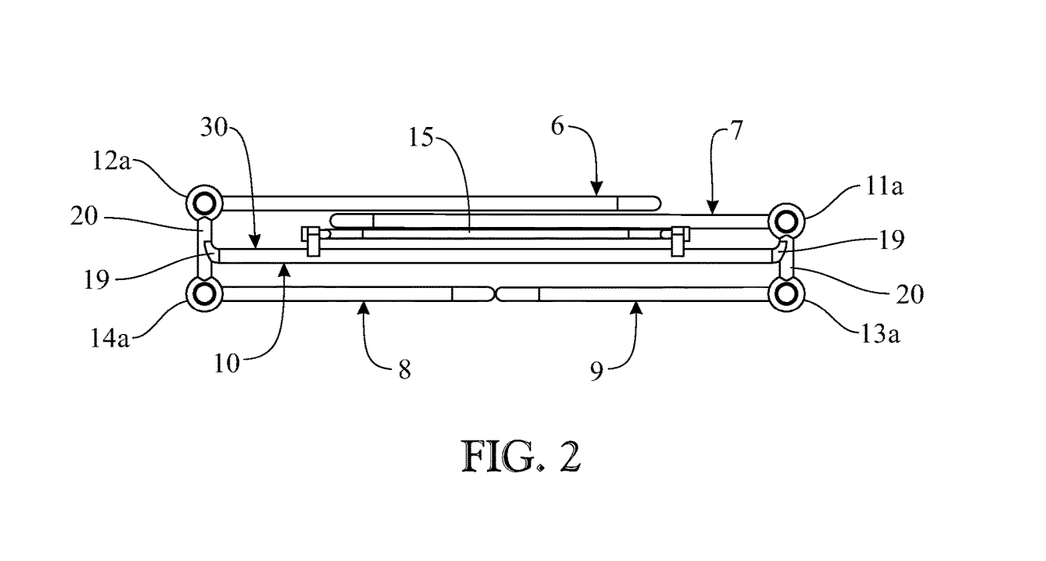
FIG. 2 illustrates a side elevation view of the device of FIG. 1.

The illustration of FIG. 2 shows a side elevation view of the support device 1 in the folded position of FIG. 1. Transverse wings 6, 7, leg members 8, 9 and longitudinal wings 15, 16 are fully folded inwards, onto one another and arranged generally parallel to one another to achieve a maximal portable position.

Figure 3:
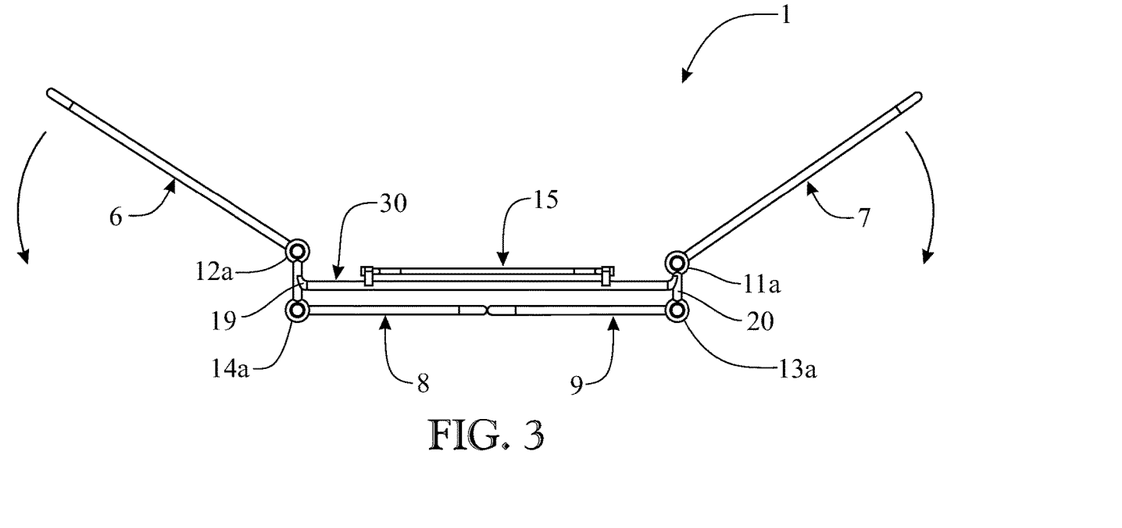
FIG. 3 describes a side elevation view of the device of FIG. 1, shown in a first partially unfolded position.

Turning to FIG. 3, the support device 1 is shown in a first partially unfolded position in accordance with the invention. Specifically, the support device 1 is shown with transverse wings 6, 7 deployed to an outward, preferably oblique position. Leg members 8, 9 and longitudinal wings 15, 16 remain folded inwards towards the center of the device.

Figure 4:
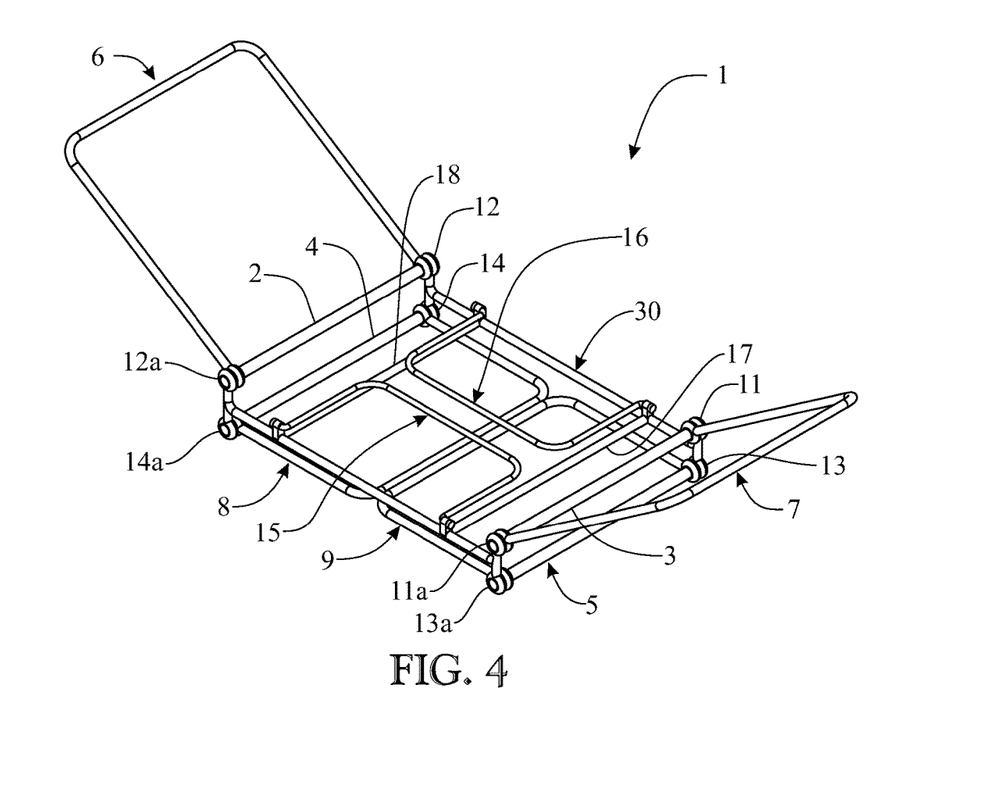
FIG. 4 presents an isometric view of the device of FIG. 3.

The illustration of FIG. 4 presents an isometric view of the support device in the first partially unfolded position of FIG. 3. As has been mentioned, the support device 1 is shown with transverse wings 6, 7 deployed to an outward, preferably oblique position, while leg members 8, 9 and longitudinal wings 15, 16 are folded inwards towards the center of the device.

Figure 5:
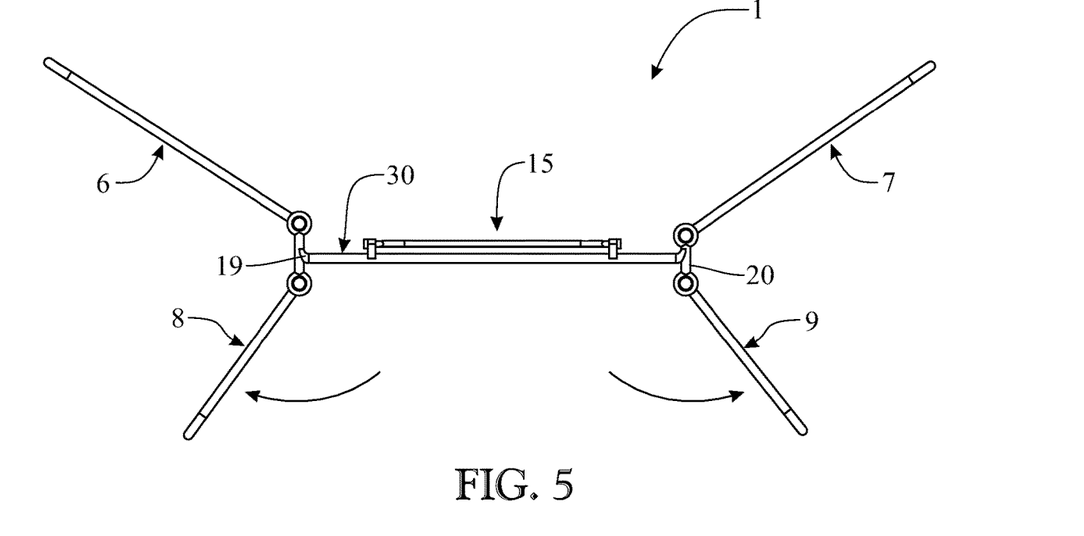
FIG. 5 illustrates a side elevation view of the device of FIG. 1, shown in a second partially unfolded position.

Turning to FIG. 5, the support device 1 is now represented in a second partially unfolded position in accordance with the invention. In this second partially unfolded position, the support device 1 is shown with transverse wings 6, 7 deployed to the outward, preferably oblique position of FIGS. 3 and 4, and with leg members 8, 9 deployed to an outward, preferably oblique position.

Figure 6:
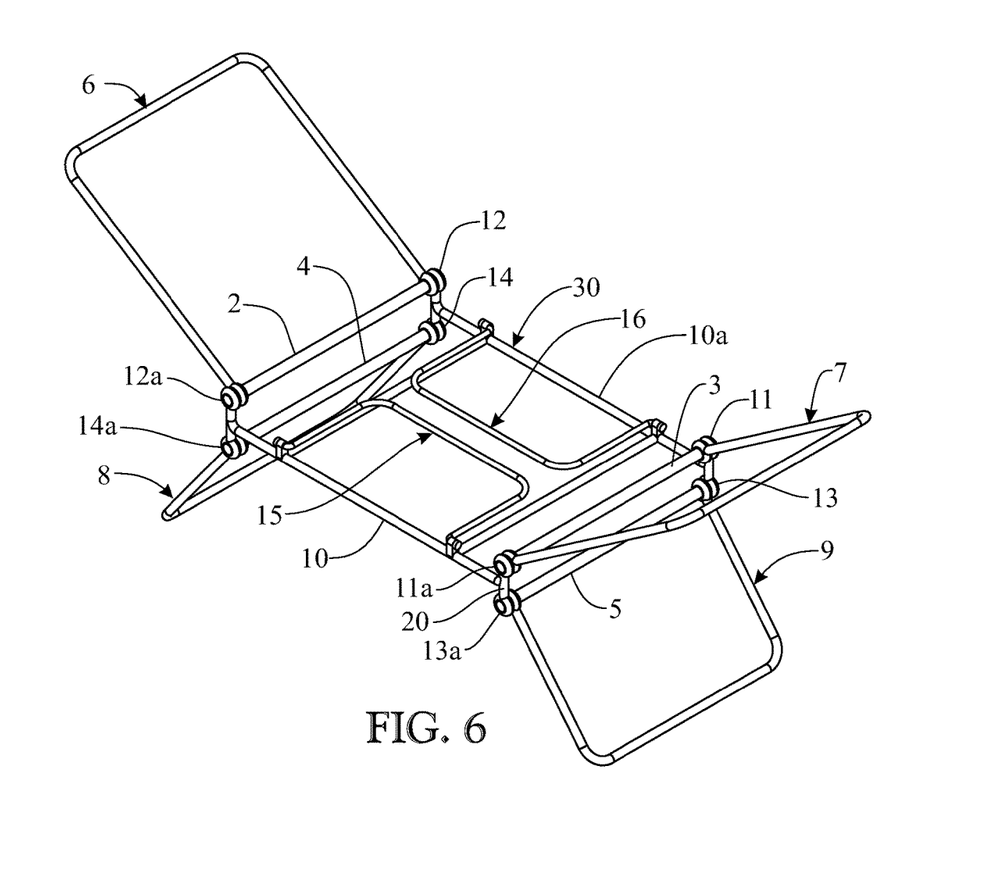
FIG. 6 describes an isometric view of the device of FIG. 5.

The illustration of FIG. 6 presents an isometric view of the support device 1 in the second partially unfolded position of FIG. 5. As has been mentioned, the support device 1 is arranged so that both transverse wings 6, 7 and leg members 8, 9 are deployed to an outward, preferably oblique position.

Figure 7:
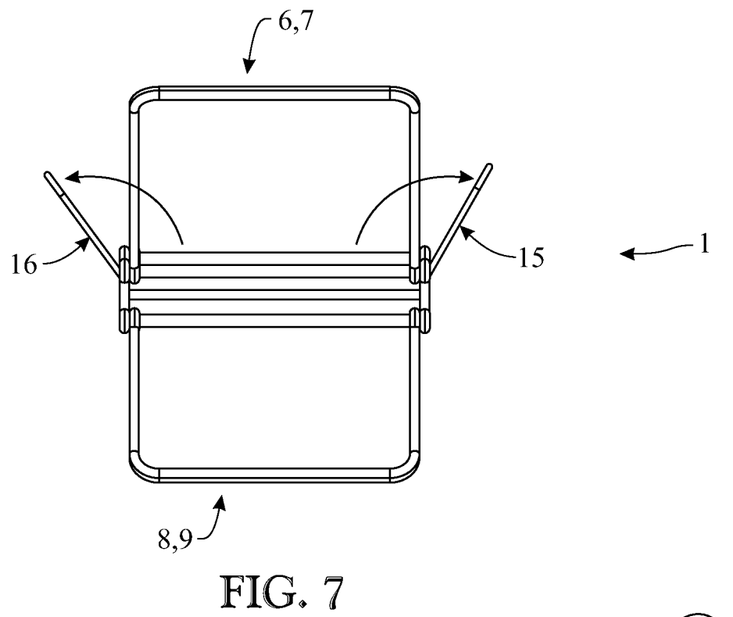
FIG. 7 presents a front elevation view of the device of FIG. 1 in a fully unfolded position.

Turning to FIG. 7, the support device 1 in presented in a fully unfolded position in accordance with the invention. In this fully unfolded position, the transverse wings 6, 7, the leg members 8, 9, and the longitudinal wings 15, 16 are fully deployed to respective outward, preferably oblique positions.

Figure 8:
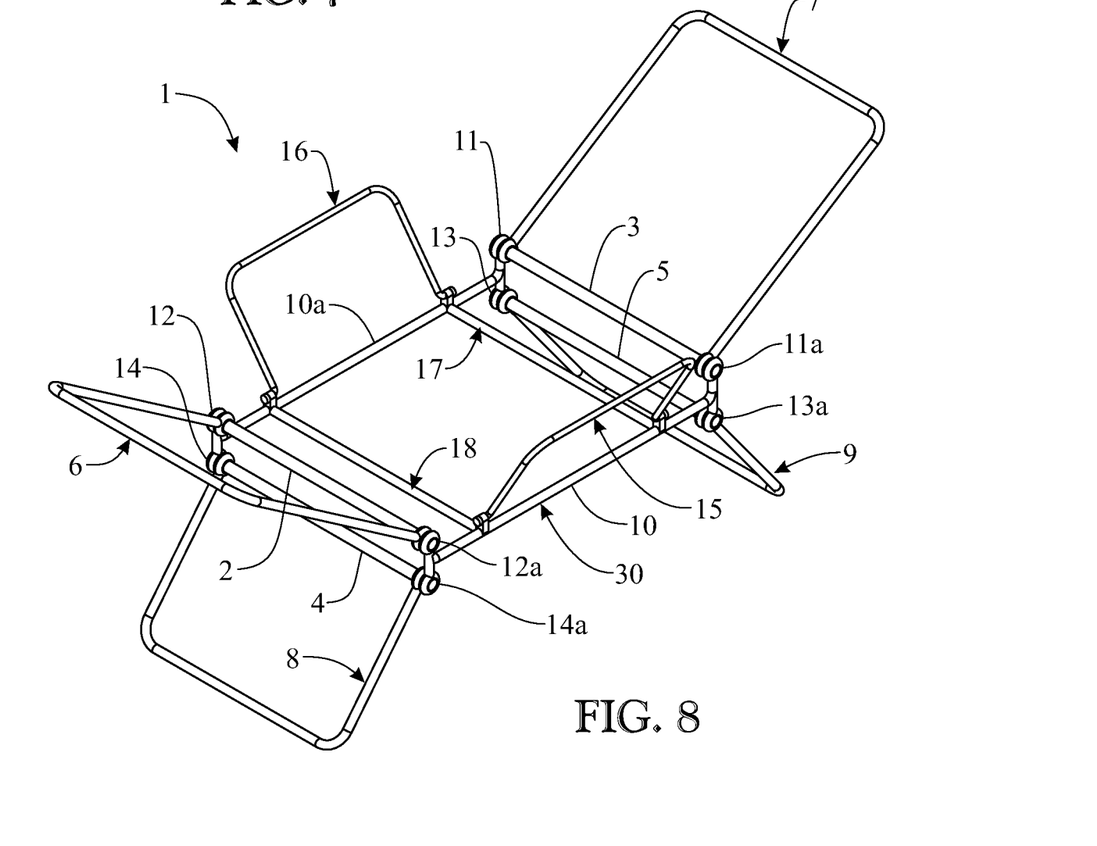
FIG. 8 illustrates an isometric view of the device of FIG. 7.

The illustration of FIG. 8 presents an isometric view of the support device 1 in the fully unfolded position of FIG. 7. The perspective nature of the illustration allows to better understand the unfolded arrangement of transverse wings 6, 7, leg members 8, 9 and longitudinal wings 15, 16. As shown, in the fully unfolded position, the transverse wings 6, 7 and longitudinal wings 15, 16 are preferably tilted, providing a stable support for the user's personal items, as the personal items tend to remain in the space delimited between the transverse wings 6, 7 and the longitudinal wings 15, 16, while maximizing the storage space delimited between the transverse wings 6, 7 and the longitudinal wings 15, 16. In turn, leg members 8, 9 are also preferably tilted when fully unfolded, in order to provide a more stable standing of the support device 1 on the ground or other surface on which it rests upon.

Figure 9:
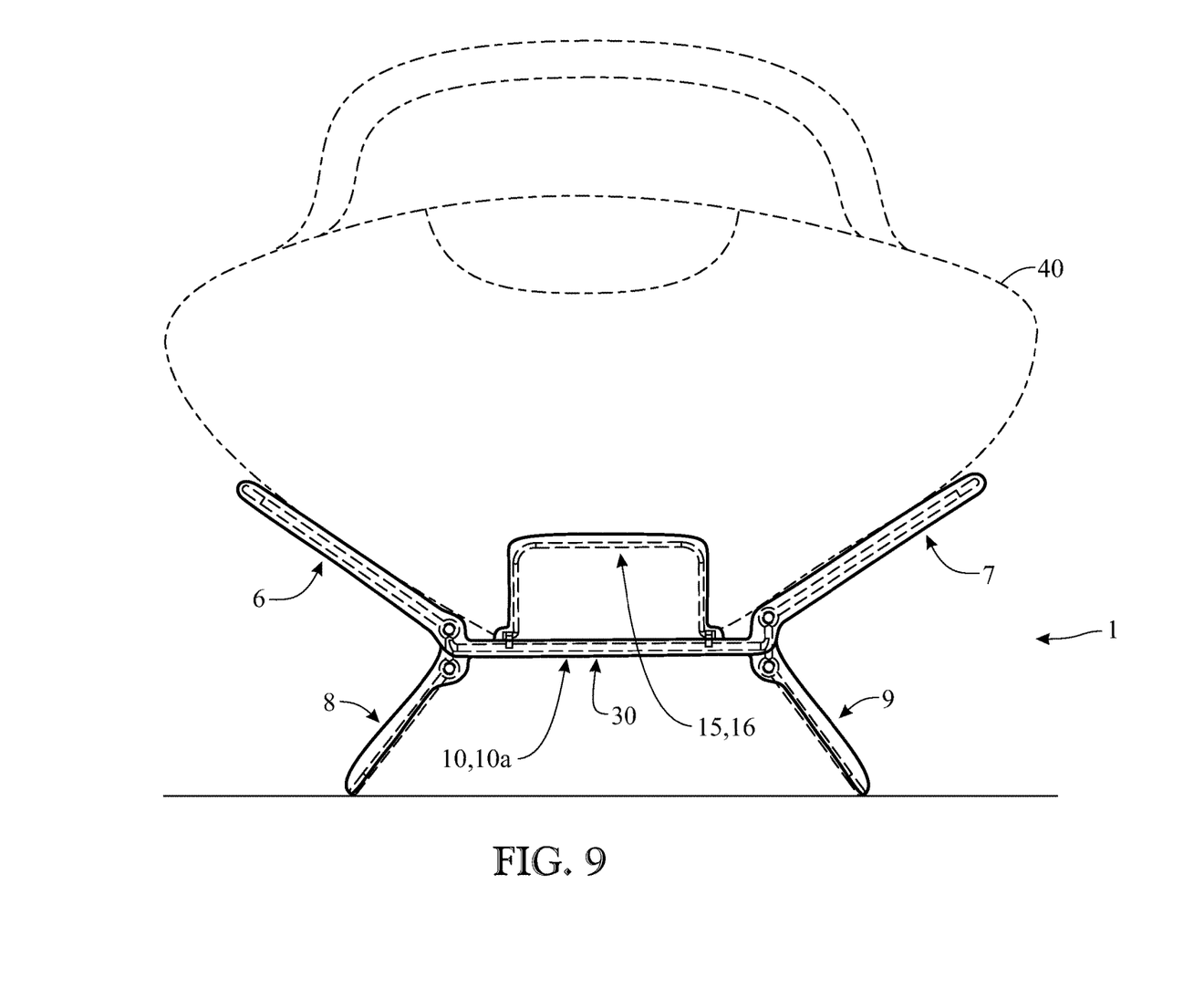
FIG. 9 presents a side elevation view of a second embodiment in which the support device includes an outer layer made of leather, plastic, rubber or the like, concealing the inner structure of the support; the support in shown in the fully unfolded position, supporting a purse.

The drawing of FIG. 9 presents a side elevation view of a second embodiment of the invention in which the support device 1 includes an outer layer made of leather, plastic, rubber or the like, concealing the inner structure of the support device 1; the support device 1 is shown in the fully unfolded position, supporting a purse 40. This figure allows for better understanding of the effect that the tilted transverse wings 6, 7 and longitudinal wings 15, 16 have in securely embracing the purse 40 while maximizing the storage space. Due to gravity, the purse 40 tends to fall along the tilted transverse wings 6, 7 and longitudinal wings 15, 16 towards the support frame 30, therefore retaining the purse within the space between the tilted transverse wings 6, 7 and longitudinal wings 15, 16. In addition, because of the tilt, the space between the tilted transverse wings 6, 7 and longitudinal wings 15, 16 is increasingly larger in a vertically upward direction and thus can accommodate relatively large items.

Figure 10:
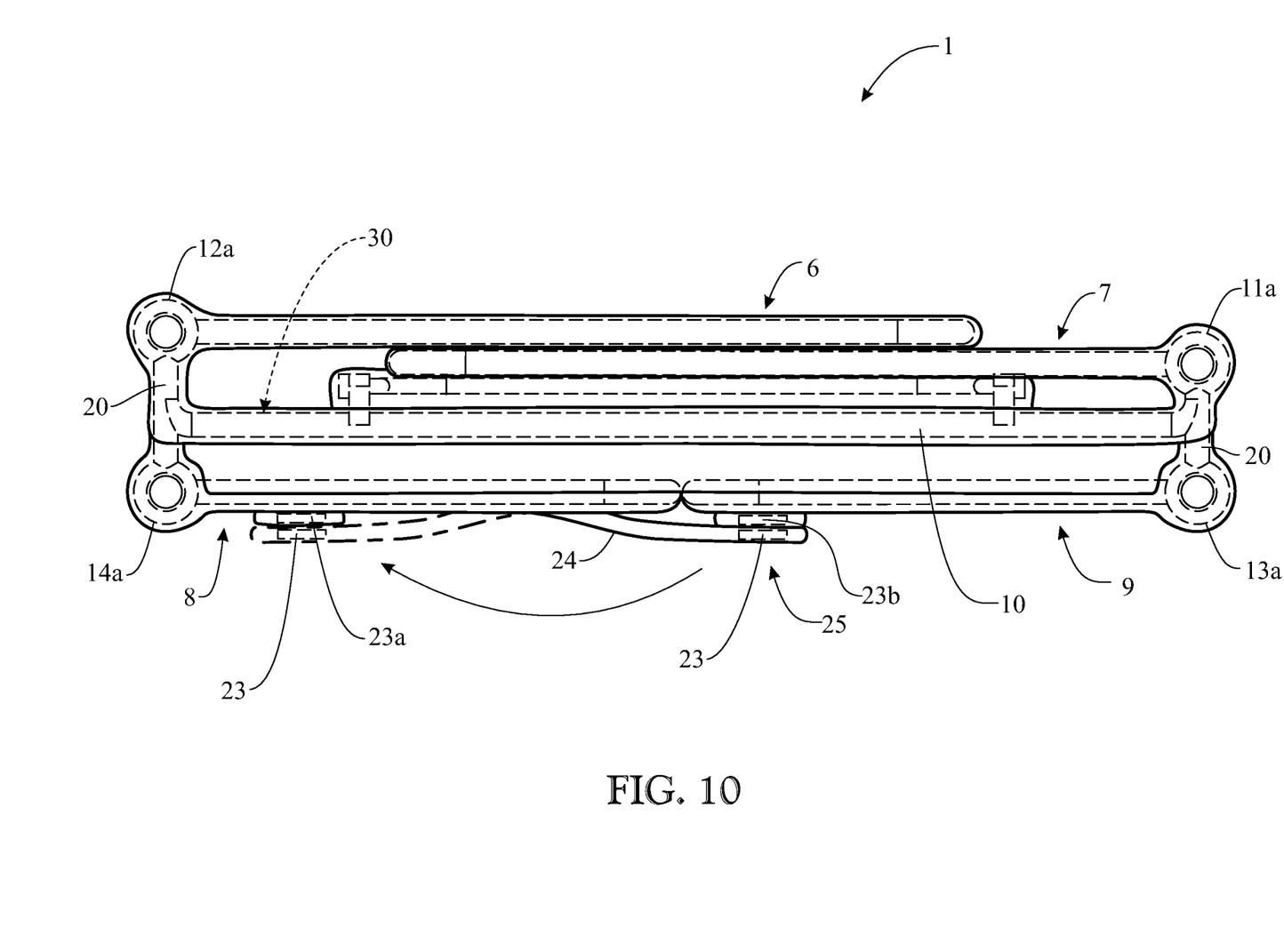
FIG. 10 presents a side elevation view of a third embodiment of the support device, including a magnetic latch that can be arranged in a locked position (solid lines) and in an unlocked position (broken lines) to respectively prevent and allow unfolding of the support legs.

The illustration of FIG. 10 shows a side elevation view of a third embodiment of the invention, consisting of a support device including a magnetic latch 25 that can be arranged in a locked position (solid lines) and in an unlocked position (broken lines) to respectively prevent and allow unfolding of the support legs. The magnetic latch 25 comprises a magnet 23 that is attached to an end of a linear protrusion 24, which is in turn attached (e.g., by an adhesive, encased in plastic along with the protrusion 24, or welded) at its other end to an integral extended portion (not shown) of the leg member 8 where the legs of the U-shaped leg member are joined at the bottom of the U.

A piece of metal or appropriate magnet 23a is attached (e.g., by an adhesive, encased in plastic along with the protrusion 24, or welded) to a lower extended portion (not shown) of the leg member 8 and a similar piece of metal or appropriate magnet 23b is attached (e.g., by an adhesive, encased in plastic along with the protrusion 24, or welded) to an upper extended portion (not shown) of leg member 9 so as to effect a magnetic locking action as protrusion 24 is moved from one position to another. The attachment of the protrusion 24 at an end thereof to an integral extended portion of the leg member 8 can be carried out by a rotational bushing assembly such as described herein with respect to 11, 11a, 12, 12a, 13, 13a, 14, 14a, a clamping system as in 21, 21a, or any other rotatable connection as would be understood by one skilled in the art.

Figure 11:
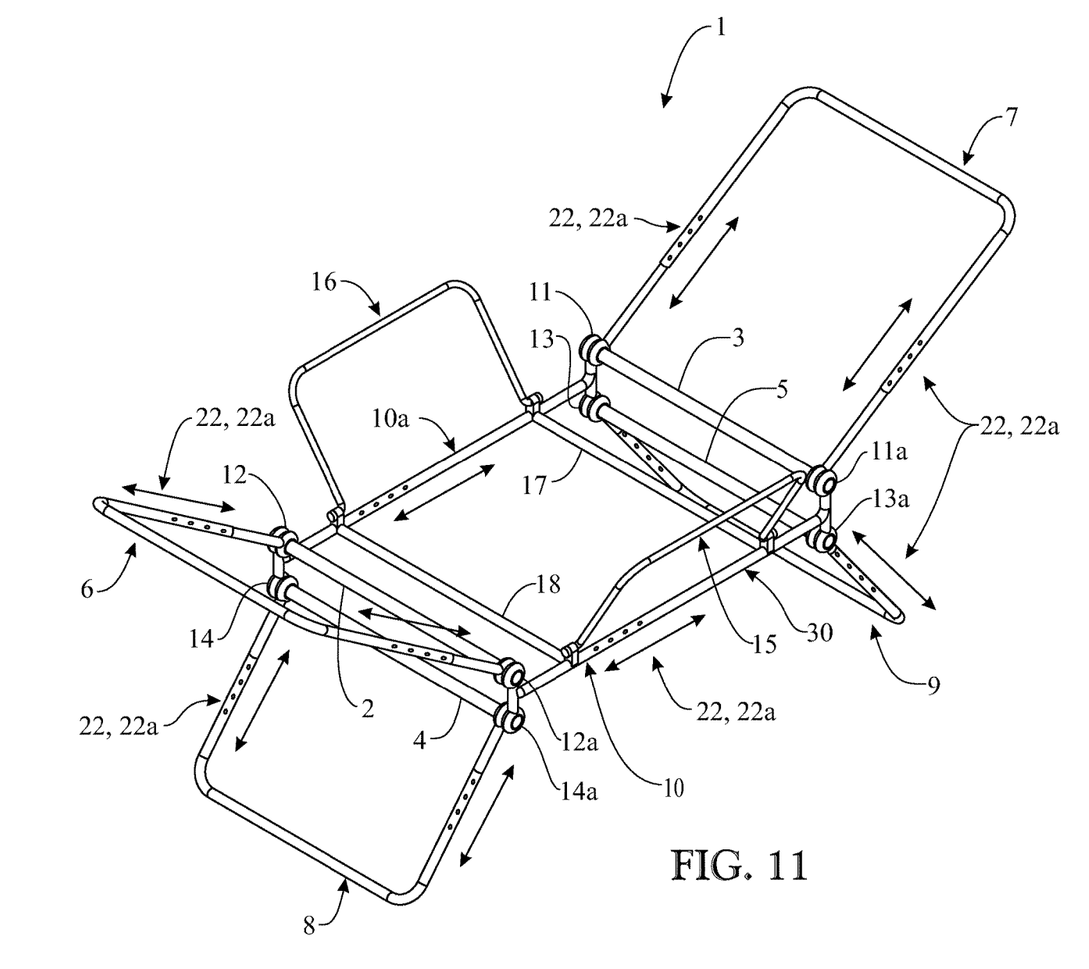
FIG. 11 presents an isometric view of a fourth embodiment of the invention, in which the size of the support device is adjustable.

The illustration of FIG. 11 presents a fourth embodiment of the invention, consisting of a support device 1 having an adjustable size. In this embodiment, the transverse wings 6, 7 and leg members 8, 9 as well as main trusses 10, 10 are adjustable according to the following schema. Each of the aforementioned is broken into telescopically-engaged portions having snap button type closures or other locking mechanisms that are selectively activated at one of multiple regularly staged perforations in order to lock the telescopically-engaged portions to a given total length. The two opposite end portions of the U-shaped wing member as well as the length of the truss is broken into two portions 22, 22a such that a tubular member 22 having a snap button connection or other locking mechanism attached thereto is inserted into a hollow cylinder making up the rest 22a of the U shaped wing, member or rest of the truss having multiple regularly staged perforations.

Because of this unique structure it is possible to variably modify the length thereof by clicking the snap button or other locking mechanism therein and adjusting the length until an appropriate size is reach whereupon a user positions the snap button or other locking mechanism to engage inside one of the multiple regularly staged perforations of the rest 22a of the U-shaped wing member or rest of the truss thereby locking the preferred size into a configuration acceptable to the user.

In alternative embodiments, the support device can be constructed having different proportions or dimensions than those of the illustrated embodiment. For instance, leg members 8, 9 could be built having a longer length, for the support to rise higher from the ground, in which case the leg members 8, 9 would be preferably foldable at different heights relative to one another for the leg members 8, 9 to be able to overlap when folded, similarly to transverse wings 6, 7. In other embodiments, transverse wings 6, 7 could be built not to overlap, similarly to leg members 8, 9 of the depicted embodiment. It is also contemplated that the transverse wings 6, 7 can be sized and/or shaped differently to one another. Similarly, it is contemplated that the longitudinal wings 15, 16 can be sized and/or shaped differently to one another.

In alternative embodiments, it is contemplated that the support device 1 further includes a flap or cover element that is configured to adopt a folded, rolled or other convenient retracted position when the device is unfolded and in use, and an unfolded position when the support device is folded for storage or transportation. In the folded position, the flap or cover element is configured to cover at least the portion of the leg members 8, 9 that touches the ground when the support device 1 is in an unfolded, standing position. The flap or cover element thus prevents germs on the leg members 8, 9 from extending, for instance to a purse that were carrying the folded support device 1.

The above-described embodiments are merely exemplary illustrations of implementations set forth for a clear understanding of the principles of the invention. Many variations, combinations, modifications or equivalents may be substituted for elements thereof without departing from the scope of the invention. Therefore, it is intended that the invention not be limited to the particular embodiments disclosed as the best mode contemplated for carrying out this invention, but that the invention will include all the embodiments falling within the scope of the appended claims.

What is claimed is:

1. A foldable support device for supporting an item, said foldable support device comprising:
    a rectilinear support frame having a front, a back, a first end and an opposing second end;
    a foldable leg rotatably affixed to a bottom of said support frame at each of said first end and said second end, each said foldable leg being selectively rotatable between a retracted position for stowage against the bottom of said support frame and an extended position for supporting said device above a surface;
    a foldable lateral wing rotatably affixed to a top of said support frame at each of said first end and said second end, each said lateral wing selectively rotatable between a retracted position for stowage against the top of said support frame and an extended position for supporting said item thereupon;
    wherein the foldable support device is dimensioned to fit within a purse, such that a user is able to transport the foldable support device within the purse;
    wherein in adopting the extended position each wing is obliquely deployed to embrace the item in a space delimited between the obliquely deployed wings, the wings each being obliquely deployable to the extended position such that an obliqueness of the wings causes the space to be increasingly larger in a vertically upward direction; and
    at least one bushing at each corner of said rectilinear support frame, one of said lateral wings rotatably attached to and rotatable about said bushings at said first end of said support frame and another of said lateral wings rotatably attached to and rotatable about said bushings at said second end of said support frame; and
said foldable support device further including:
    forming the support frame, an anterior horizontal truss, a posterior horizontal truss, and two transverse horizontal trusses;
    a foldable anterior wing rotatably affixed to said front of said support frame and selectively rotatable between a retracted position for stowage towards the top of said support frame and an extended position to aid in embracing said item thereupon wherein the anterior wing is affixed to the anterior horizontal truss of the support frame; and
    a foldable posterior wing rotatably affixed to said back of said support frame and selectively rotatable between a retracted position for stowage against the top of said support frame and an extended position to aid in embracing said item thereupon wherein the posterior wing is affixed to the posterior horizontal truss of the support frame; and
    wherein the anterior horizontal truss, posterior horizontal truss, and said two transverse horizontal trusses form the support frame and are non-movable relative to one another in a rectilinear configuration, for providing a rigid and non-collapsible central support for said foldable legs and foldable said lateral, anterior, and posterior wings;
    wherein in the respective retracted positions of the foldable legs and the foldable wings, all of the foldable legs, foldable wings, and horizontal trusses of the support frame are all parallel with one another to create a flat profile for fitting within the purse.

2. The foldable support device according to claim 1, wherein each said foldable leg is a U-shaped structure having two opposed free ends and further wherein each free end is rotatably attached to a respective one of said first end and said second end of said support frame.

3. The foldable support device according to claim 1, wherein each said lateral wing is a U-shaped structure having two opposed free ends and further wherein each free end is rotatably attached to a respective one of said first end and said second end of said support frame.

4. The foldable support device according to claim 1, the at least one bushing including two bushings at each corner of said rectilinear support frame, said two bushings being vertically separated one from the other, and further wherein one of said lateral wings is rotatably attached to and rotatable about an upper pair of said bushings at said first end of said support frame and another of said lateral wings is rotatably attached to and rotatable about an upper pair of said bushings at said second end of said support frame.

5. The foldable support device according to claim 4, wherein one of said foldable legs is rotatably attached to and rotatable about a lower pair of said bushings at said first end of said support frame and another of said foldable legs is rotatably attached to and rotatable about a lower pair of said bushings at said second end of said support frame.

6. The foldable support device according to claim 5, further including a first outer transverse truss extending between said upper bushings at said first end, a second outer transverse truss extending between said upper bushings at said second end, a third outer transverse truss extending between said lower bushing at said first end and a fourth outer transverse truss extending between said lower bushings at said second end, each said first, second, third, and fourth trusses affixed to said support frame and supporting said bushings.

7. The foldable support device according to claim 1, including a magnetic latch, said magnetic latch selectively movable between a locked position and an unlocked position, said magnetic latch including a linear protrusion affixed to a first of said legs and a magnet affixed to a free end of said linear protrusion, said magnet engageable with a second of said legs to secure said legs in a stowed configuration.

8. The foldable support device according to claim 1, further including an outer layer closely encasing at least said support frame, said foldable legs, and said foldable lateral wings.

9. The foldable support device according to claim 1, wherein at least one of said support frame, said foldable lateral wings, and said foldable legs is broken into separable portions, said portions including a locking mechanism on one of said portions and a plurality of regularly spaced perforations on a mating one of said portions for selectively extending a size of at least one of said support frame, said foldable lateral wings, and said foldable legs.

10. A foldable support device for supporting an item, said foldable support device comprising:
- a rectilinear support frame having a front, a back, a first end and an opposing second end;
- a foldable leg being a U-shaped structure having two opposed free ends, each said free end rotatably affixed to a bottom of said support frame at said first end and a foldable leg being a U-shaped wire having two opposed free ends, each said free end rotatably affixed to the bottom of said support frame at said second end, each said foldable leg selectively rotatable between a retracted position for stowage against the bottom of said support frame and an extended position for supporting said device above a surface;
- a foldable lateral wing being a U-shaped structure having two opposed free ends, each said free end rotatably affixed to a top of said support frame at said first end and a foldable lateral wing being a U-shaped wire having two opposed free ends, each said free end rotatably affixed to the top of said support frame at said second end, each said lateral wing selectively rotatable between a retracted position for stowage against the top of said support frame and an extended position for supporting said item thereupon;
- wherein the foldable support device is dimensioned to fit within a purse, such that a user is able to transport the foldable support device within the purse;
- wherein the foldable support device further includes:
- forming the support frame, an anterior horizontal truss, a posterior horizontal truss, and two transverse horizontal trusses; and
- a foldable anterior wing rotatably affixed to said front of said support frame and selectively rotatable between a retracted position for stowage towards the top of said support frame and an extended position to aid in embracing said item thereupon wherein the anterior wing is affixed to the anterior horizontal truss of the support frame;
- a foldable posterior wing rotatably affixed to said back of said support frame and selectively rotatable between a retracted position for stowage against the top of said support frame and an extended position to aid in embracing said item thereupon wherein the posterior wing is affixed to the posterior horizontal truss of the support frame;
- wherein the anterior horizontal truss, posterior horizontal truss, and said two transverse horizontal trusses form the support frame and are non-movable relative to one another in a rectilinear configuration for providing a rigid and non-collapsible central support for said foldable legs and foldable said lateral, anterior, and posterior wings;
- wherein in the respective retracted positions of the foldable legs and the foldable lateral, anterior, posterior wings, all of the foldable legs, foldable wings, and horizontal trusses of the support frame are all parallel with one another to create a flat profile for fitting within the purse;
- wherein in adopting the extended position each wing is obliquely deployed to embrace the item in a space delimited between the obliquely deployed wings, the wings each being obliquely deployable to the extended position such that an obliqueness of the wings causes the space to be increasingly larger in a vertically upward direction.

11. The foldable support device according to claim 10, including at least one bushing at each corner of said rectilinear support frame, one of said lateral wings rotatably attached to and rotatable about said bushings at said first end of said support frame and another of said lateral wings rotatably attached to and rotatable about said bushings at said second end of said support frame.

12. The foldable support device according to claim 10, including two bushings at each corner of said rectilinear support frame, said two bushings being vertically separated one from the other, and further wherein one of said lateral wings is rotatably attached to and rotatable about an upper pair of said bushings at said first end of said support frame and another of said lateral wings is rotatably attached to and rotatable about an upper pair of said bushings at said second end of said support frame.

13. The foldable support device according to claim 12, wherein one of said foldable legs is rotatably attached to and rotatable about a lower pair of said bushings at said first end of said support frame and another of said foldable legs is rotatably attached to and rotatable about a lower pair of said bushings at said second end of said support frame.

14. The foldable support device according to claim 13, further including a first outer transverse truss extending between said upper bushings at said first end, a second outer transverse truss extending between said upper bushings at said second end, a third outer transverse truss extending between said lower bushings at said first end and a fourth outer transverse truss extending between said lower bushings at said second end, each said first, second, third, and fourth trusses affixed to said support frame and supporting said bushings.

15. The foldable support device according to claim 10, further including an outer layer closely encasing at least said support frame, said foldable legs, and said foldable lateral wings.

16. The foldable support device according to claim 10, wherein at least one of said support frame, said foldable lateral wings, and said foldable legs is broken into separable portions, said portions including a snap button closure on one said portion and a plurality of regularly spaced perforations on a mating one of said portions for selectively extending a size of at least one of said support frame, said foldable lateral wings, and said foldable legs.

17. A foldable support device for supporting an item, said foldable support device comprising:
- a rectilinear support frame having a front, a back, a first end and an opposing second end, said support frame including two bushings at each corner thereof, said two bushings being vertically separated one from the other;
- a foldable leg being a U-shaped wire having two opposed free ends rotatably attached to a lower pair of said bushings at said first end of said support frame and a foldable leg being a U-shaped wire having two opposed free ends rotatably attached to a lower pair of said bushings at said second end of said support frame, each said foldable leg selectively rotatable between a retracted position for stowage against a bottom of said support frame and an extended position for supporting said device above a surface;

a foldable lateral wing being a U-shaped wire having two opposed free ends rotatably attached to a top pair of said bushings at said first end of said support frame, and a foldable lateral wing being a U-shaped wire having two opposed free ends rotatably attached to the top pair of said bushings at said second end of said support frame, each said lateral wing selectively rotatable between a retracted position for stowage against a top of said support frame and an extended position for supporting said item thereupon;

wherein the foldable support device is dimensioned to fit within a purse, such that a user is able to transport the foldable support device within the purse;

wherein the foldable support device further includes:

forming the support frame, an anterior horizontal truss, a posterior horizontal truss, and two transverse horizontal trusses; and a foldable anterior wing rotatably affixed to said front of said support frame and selectively rotatable between a retracted position for stowage towards the top of said support frame and an extended position to aid in embracing an item thereupon wherein the anterior wing is affixed to the anterior horizontal truss of the support frame;

a foldable posterior wing rotatably affixed to said back of said support frame and selectively rotatable between a retracted position for stowage against the top of said support frame and an extended position to aid in embracing said item thereupon wherein the posterior wing is affixed to the posterior horizontal truss of the support frame;

wherein the anterior horizontal truss, posterior horizontal truss, and said two transverse horizontal trusses form the support frame and are non-movable relative to one another in a rectilinear configuration, for providing a rigid and non-collapsible central support for said foldable legs and foldable said lateral, anterior, and posterior wings;

wherein in the respective retracted positions of the foldable legs and the foldable wings, all of the foldable legs, foldable wings, and horizontal trusses of the support frame are all parallel with one another to create a flat profile for fitting within the purse;

wherein in adopting the extended position each wing is obliquely deployed to embrace the item in a space delimited between the obliquely deployed wings, the wings each being obliquely deployable to the extended position such that an obliqueness of the wings causes the space to be increasingly larger in a vertically upward direction.

* * * * *